(12) United States Patent
Tamaoka et al.

(10) Patent No.: US 8,754,554 B2
(45) Date of Patent: Jun. 17, 2014

(54) MOTOR AND DISK DRIVE APPARATUS

(75) Inventors: Takehito Tamaoka, Kyoto (JP); Kazuhiro Sato, Kyoto (JP); Kazuhiko Fukushima, Kyoto (JP)

(73) Assignee: Nidec Corporation, Kyoto (JP)

( * ) Notice: Subject to any disclaimer, the term of this patent is extended or adjusted under 35 U.S.C. 154(b) by 141 days.

(21) Appl. No.: 13/564,900

(22) Filed: Aug. 2, 2012

(65) Prior Publication Data

US 2013/0049551 A1 Feb. 28, 2013

(30) Foreign Application Priority Data

Aug. 31, 2011 (JP) ................................. 2011-188363
Nov. 11, 2011 (JP) ................................. 2011-247827

(51) Int. Cl.
*H02K 7/00* (2006.01)

(52) U.S. Cl.
USPC .......................................... 310/67 R; 310/90

(58) Field of Classification Search
USPC ................... 310/67 R, 90; 384/100
See application file for complete search history.

(56) References Cited

U.S. PATENT DOCUMENTS

| | | | |
|---|---|---|---|
| 7,012,191 B1 | 3/2006 | Watanabe et al. | |
| 7,355,313 B2* | 4/2008 | Takamatsu et al. | 310/216.016 |
| 8,120,872 B2 | 2/2012 | Sekii et al. | |
| 8,363,352 B2 | 1/2013 | Kang | |
| 8,552,606 B1* | 10/2013 | Cheong et al. | 310/90 |
| 2005/0116564 A1* | 6/2005 | Tokunaga et al. | 310/90 |
| 2006/0138886 A1 | 6/2006 | Ito et al. | |
| 2006/0244326 A1* | 11/2006 | Tamaoka | 310/90 |
| 2006/0265871 A1 | 11/2006 | Ito et al. | |
| 2007/0046129 A1* | 3/2007 | Suginobu | 310/216 |
| 2007/0247010 A1 | 10/2007 | Ichizaki | |
| 2007/0278880 A1 | 12/2007 | Wada et al. | |
| 2008/0019038 A1 | 1/2008 | Xu et al. | |
| 2008/0084142 A1 | 4/2008 | Ino et al. | |
| 2009/0115277 A1* | 5/2009 | Yajima | 310/90 |
| 2010/0177627 A1 | 7/2010 | Ino et al. | |
| 2012/0200957 A1 | 8/2012 | Yawata | |
| 2013/0127273 A1* | 5/2013 | Lee | 310/90 |

FOREIGN PATENT DOCUMENTS

| | | |
|---|---|---|
| JP | 05-207717 A | 8/1993 |
| JP | 05-070184 U | 9/1993 |
| JP | 05-316704 A | 11/1993 |
| JP | 06-343242 A | 12/1994 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Hanh Nguyen
(74) *Attorney, Agent, or Firm* — Keating & Bennett, LLP

(57) ABSTRACT

A rotary unit of a motor includes a tubular hub portion. A bearing mechanism of the motor includes a bearing portion positioned radially inward of the hub portion. A stationary unit of the motor includes a stator fixing portion positioned inward of the hub portion and higher than a lower end of the hub portion. A cylinder gap is defined between the hub portion and an upper section of the bearing portion. A first communication gap is defined between a lower section of the hub portion and an upper section of the stator fixing portion. A second communication gap is defined between the lower end of the hub portion and a radial inner section of the stator core.

12 Claims, 19 Drawing Sheets

(56) References Cited

FOREIGN PATENT DOCUMENTS

| JP | 08-033253 A | 2/1996 |
|---|---|---|
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus," U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al ,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

MOTOR AND DISK DRIVE APPARATUS

BACKGROUND OF THE INVENTION

1. Field of the Invention

The present invention relates to an electric motor and more specifically to a disk drive apparatus provided with the motor.

2. Description of the Related Art

Conventionally, a spindle motor is mounted to a disk drive apparatus such as a hard disk drive. A conventional brushless motor disclosed in Japanese Patent Application Publication No. 2007-295666 includes an attachment plate, a substantially cylindrical bushing, a thrust plate, a sleeve, and a shaft. The bushing is fitted to a fixing hole of the attachment plate. The thrust plate is fixed to the lower portion of the bushing. The sleeve is made of an oil-impregnated sintered material and is press-fitted to the inner circumferential surface of the bushing. The shaft is inserted into the sleeve. The shaft is supported in the radial direction by the sleeve and is supported in the thrust direction by a thrust washer arranged on the upper surface of the thrust plate.

A conventional motor for disk devices disclosed in Japanese Patent Application Publication No. 2003-153481 includes a bracket, a bearing as a ball bearing, a rotor, and a stator. The bracket is fixed to a chassis of a disk device. The bracket includes an inner cylinder portion extending in the axial direction. The bearing is fixed to the inside of the inner cylinder portion. A shaft portion of a rotor is rotatably supported by the bearing. A stator core of a stator is fixed to the outer circumferential surface of the inner cylinder portion. The inner circumferential portion of the stator core contacts the bottom surface portion of the bracket. Coils are formed in the outer circumferential portion of the stator core. The outer circumferential portion of the stator core is positioned axially above the inner circumferential portion thereof. Since the outer circumferential portion of the stator core is separated from the bottom surface portion, it is possible to prevent the coils and the bottom surface portion from interfering with each other.

However, in a motor in which a rotary unit is rotatably supported by a lubricant, it is necessary to suppress vaporization of a lubricant held within a bearing mechanism.

SUMMARY OF THE INVENTION

A motor in accordance with a preferred embodiment of the present invention includes a stationary unit, a rotary unit, and a bearing mechanism. The bearing mechanism is arranged to support the rotary unit so as to rotate with respect to the stationary unit about a center axis extending in an up-down direction. The rotary unit includes a cover portion extending around the center axis, a sidewall portion, a hub portion, and a rotor magnet. The sidewall portion extends downward from an outer edge of the cover portion. The hub portion protrudes downward from the cover portion at a radial inner side of the sidewall portion. The rotor magnet is fixed to an inner circumferential surface of the sidewall portion.

The bearing mechanism includes a shaft portion and a bearing portion. The shaft portion extends downward from the cover portion along the center axis. The bearing portion to which the shaft portion is inserted is arranged to support the shaft portion through a lubricant. The bearing portion includes an upper section positioned radially inward of the hub portion.

The stationary unit includes a stator, a base portion, and a stator fixing portion. The stator is positioned radially inward of the rotor magnet. The base portion is positioned below the stator. The stator fixing portion extends upward from a central portion of the base portion. The stator fixing portion includes an upper end positioned radially inward of the hub portion and axially higher than a lower end of the hub portion.

The stator includes a stator core and a plurality of coils. The stator core includes an annular core-back and a plurality of teeth portions. The core-back is arranged below the hub portion. The teeth portions extend radially outward from the core-back. The coils are arranged around the teeth.

Each of the teeth portions includes a coil winding portion wound with each of the coils and a slanted portion extending radially outward and upward.

A seal region in which a boundary surface of the lubricant is provided is defined between the upper section of the bearing portion and the rotary unit. A substantially cylindrical cylinder gap is defined between an inner circumferential surface of the hub portion and an outer circumferential surface of the upper section of the bearing portion.

A first communication gap is defined between a lower section of the hub portion and an upper section of the stator fixing portion. The first communication gap includes a section extending in an axial direction or inclined radially outward and downward. Further, a second communication gap is defined between the lower end of the hub portion and a radial inner section of the stator core. The second communication gap extends radially outward from the first communication gap.

With the motor in accordance with preferred embodiments of the present invention, it is possible to significantly reduce and prevent vaporization of a lubricant held within a bearing mechanism of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 along the center axis direction of a motor will be just referred to as "upper" and the lower side as "lower". The up-down direction is not intended to indicate the positional relationship and orientation of the motor installed in an actual device. The direction parallel to or substantially parallel to the center axis will be referred to as "axial". The radial direction about the center axis will be just referred to as "radial". The circumferential direction about the center axis will be just referred to as "circumferential".

Figure 1:
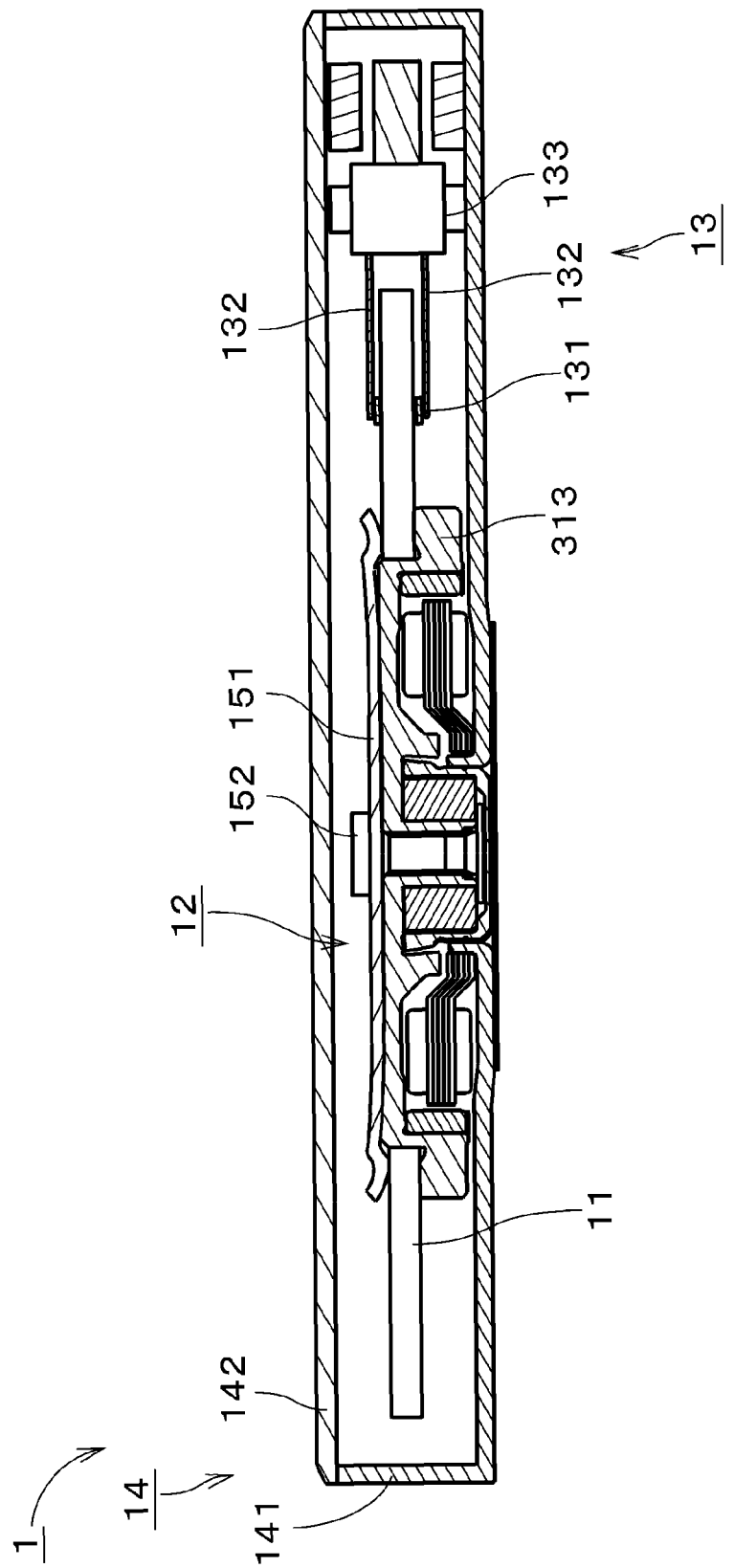
FIG. 1 is a sectional view showing a disk drive apparatus according to a related preferred embodiment of the present invention.

FIG. 1 is a vertical sectional view of a disk drive apparatus 1 including a spindle motor 12 according to a related preferred embodiment of the present invention of the present invention. In the following description, the spindle motor 12 will be just referred to as "motor 12". The disk drive apparatus 1 is, e.g., a hard disk drive. The disk drive apparatus 1 can be mounted to a so-called tablet personal computer, for example. The disk drive apparatus 1 preferably includes a disk 11, a motor 12, an access unit 13, a housing 14, and a clamper 151. The motor 12 rotates the disk 11 which is arranged to record information. The access unit 13 performs at least one of an information reading task and an information recording task with respect to the disk 11.

The housing 14 preferably includes a cup-shaped first housing member 141 and a plate-shaped second housing member 142. The disk 11, the motor 12, the access unit 13, and the clamper 151 are accommodated within the first housing member 141. The second housing member 142 is fitted to the first housing member 141, thereby defining the housing 14. Preferably, the internal space of the disk drive apparatus 1 is a clean space in which dust or dirt is either not present or is extremely rare. Air is preferably filled in the internal space of the disk drive apparatus 1. Alternatively, a helium gas, a hydrogen gas or a mixture of the helium gas and/or the hydrogen gas with air, for example, may be filled in the internal space of the disk drive apparatus 1. While not shown in FIG. 1, a flexible wiring substrate to be described later is preferably arranged on the lower surface of the first housing member 141 in the disk drive apparatus 1.

The disk 11 is clamped to the motor 12 by the clamper 151. The access unit 13 preferably includes a head 131, an arm 132 and a head moving mechanism 133. The head 131 is arranged adjacent to the disk 11 to magnetically perform at least one of an information reading task and an information recording task. The arm 132 supports the head 131. The head moving mechanism 133 moves the arm 132 so that the head 131 can be moved with respect to the disk 11. With these configurations, the head 131 gains access to a desired position on the rotating disk 11 in a state where the head 131 is kept in close proximity with the disk 11.

Figure 2:
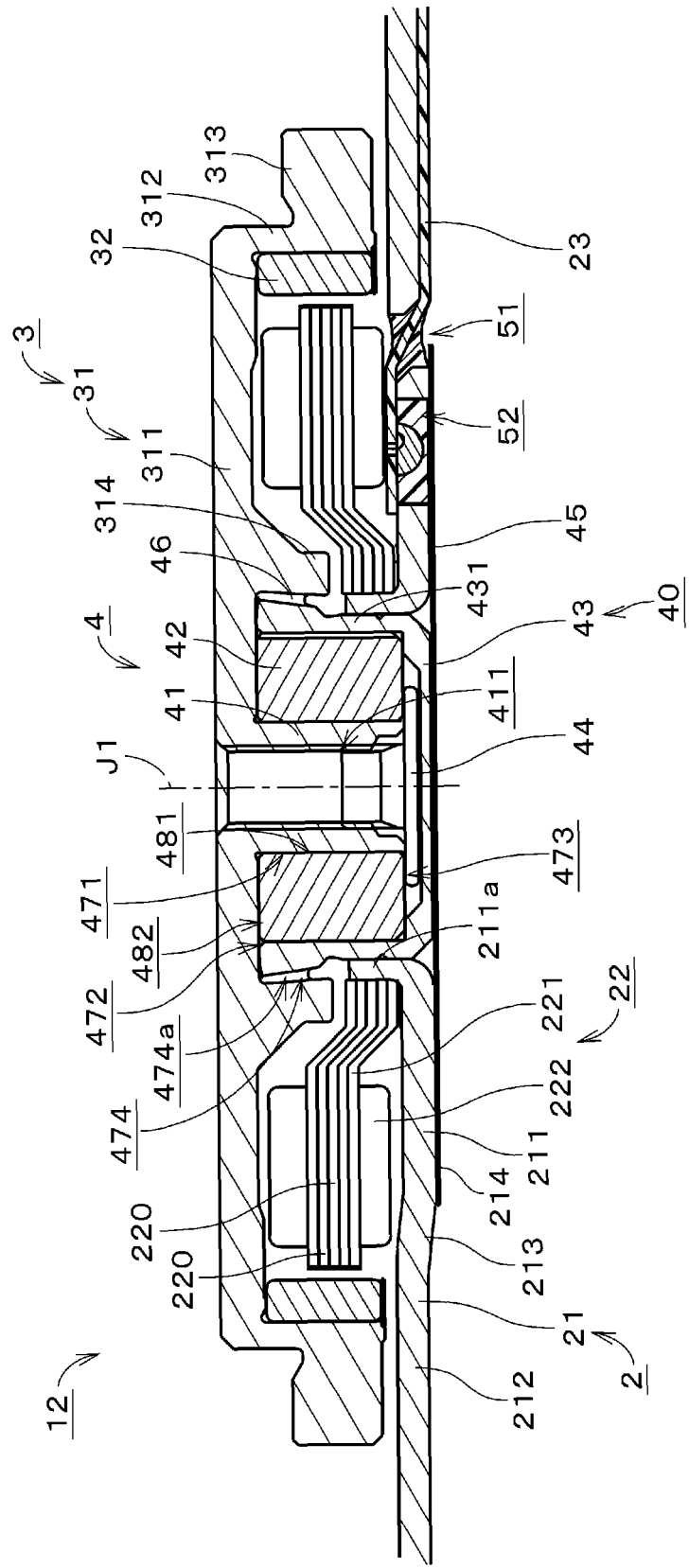
FIG. 2 is a sectional view showing a motor in accordance with a preferred embodiment of the present invention.

FIG. 2 is a vertical sectional view of the motor 12. The motor 12 is preferably an outer-rotor-type three-phase motor. The motor 12 preferably includes a stationary unit 2, a rotary unit 3, and a fluid dynamic pressure bearing mechanism 4. In the following description, the fluid dynamic pressure bearing mechanism 4 will be just referred to as "bearing mechanism 4". The rotary unit 3 is supported by the bearing mechanism 4 so that the rotary unit 3 can rotate with respect to the stationary unit 2 about the center axis J1 extending in the up-down direction of the motor 12.

The stationary unit 2 preferably includes a base plate 21 defining a base portion, a stator 22, and a flexible wiring substrate 23. In the following description, the flexible wiring substrate 23 will be just referred to as "substrate 23". The base plate 21 is preferably a member formed by pressing a metal plate member, however, any other type of base plate could be used instead. The base plate 21 is preferably a portion of the first housing member 141 shown in FIG. 1. The base plate 21 preferably includes a substrate insertion hole 51, a solder reception hole and a stator fixing portion 211a. The substrate insertion hole 51 and the solder reception hole 52 are preferably through-holes extending through the base plate 21 in the up-down direction. The substrate 23 extends from the lower surface of the base plate 21 to the upper surface thereof through the substrate insertion hole 51. The stator fixing portion 211a preferably has a substantially cylindrical shape and extends upward from the central portion of the base plate 21. The base plate 21 and the stator fixing portion 211a are preferably formed by a press into a continuous monolithic member. Alternatively, the base plate 21 may also be formed by casting.

The stator 22 is arranged above the base plate 21. The stator 22 preferably includes a stator core 221 and a plurality of coils 222. The stator core 221 is preferably provided by axially stacking a plurality of electromagnetic steel plates 220, however, any other desirable type of stator core could be used instead. The coils 222 are preferably provided by winding conductive wires on the stator core 221. The radial inner portion of the stator core 221 is fixed to the outer circumferential surface of the stator fixing portion 211a. Electric power is supplied from an external power source to the stator 22 via the substrate 23.

The rotary unit 3 preferably includes a rotor hub 31 and a rotor magnet 32. The rotor hub 31 preferably includes a cover portion 311, a substantially cylindrical sidewall portion 312, and a disk mounting portion 313. The cover portion 311 is preferably defined by an annular shape about the center axis J1 and is positioned above the stator 22. The sidewall portion 312 extends downward from the outer edge of the cover portion 311. The disk mounting portion 313 extends radially outward from the sidewall portion 312. The disk 11 shown in FIG. 1 is mounted on the disk mounting portion 313. The rotor magnet 32 is fixed to the inner circumferential surface of the sidewall portion 312 and is positioned radially outward of the stator 22. As the electric power is supplied to the stator 22, torque is generated between the stator 22 and the rotor magnet 32.

The bearing mechanism 4 preferably includes a shaft portion 41, a sleeve 42, a sleeve housing 43, a thrust plate 44, a seal member 45, and a lubricant 46. In the following description, the sleeve 42 and the sleeve housing 43 will be collectively referred to as "bearing unit 40". The shaft portion 41 extends downward from the radial inner section of the cover portion 311 in a coaxial or substantially coaxial relationship with the center axis J1. The shaft portion 41 and the rotor hub are defined by a continuously-extending member. A female thread portion 411 is provided on the inner surface of the shaft portion 41 over the whole length of the shaft portion 41. At the center of the cover portion 311, a screw 152 shown in FIG. 1 is threadedly coupled to the female thread portion 411, whereby the clamper 151 is fixed to the motor 12.

The sleeve housing 43 is preferably a substantially cylindrical closed-bottom member. The cylinder portion 431 of the sleeve housing 43 is arranged inside the stator fixing portion 211a. A tubular hub portion 314 protruding downward from the cover portion 311 is positioned at the radial inner side of the sidewall portion 312 and at the radial outer side of the stator fixing portion 211a and the sleeve housing 43. A cylinder gap 474 having a substantially cylindrical shape is defined between the inner circumferential surface of the hub portion 314 and the upper section of the outer circumferential surface of the cylinder portion 431. The sleeve 42 is arranged on the inner circumferential surface of the sleeve housing 43. The shaft portion 41 is inserted into the sleeve 42. The thrust plate 44 is preferably fixed to the shaft portion 41 by threadedly coupling a central thread portion thereof to the lower extension of the female thread portion 411. The seal member 45 is preferably adhesively bonded to the lower surface of the sleeve housing 43 and the lower surface 214 of the central portion 211 of the base plate 21.

In the motor 12, the lubricant 46 is preferably continuously present in the radial gap 471 between the inner circumferential surface of the sleeve 42 and the outer circumferential surface of the shaft portion 41, in the thrust gap 472 between the upper surface of the sleeve 42 and the upper surface of the sleeve housing 43 and the lower surface of the cover portion 311, in the gap 473 around the thrust plate 44 and in the cylinder gap 474. A seal region 474a for holding the lubricant 46 is defined in the cylinder gap 474.

Radial dynamic pressure groove arrays are preferably provided in the upper and lower sections of the inner circumferential surface of the sleeve 42. In the radial gap 471, a radial dynamic pressure bearing portion 481 is defined by the radial dynamic pressure groove arrays. In the thrust gap 472, a thrust dynamic pressure bearing portion 482 is defined by a thrust dynamic pressure groove array. During the operation of the motor 12, the shaft portion 41 and the thrust plate 44 are supported by the radial dynamic pressure bearing portion 481 and the thrust dynamic pressure bearing portion 482 without making contact with the bearing unit 40. Thus, the rotary unit 3 is rotatably supported with respect to the base plate 21 and the stator 22.

Figure 3:
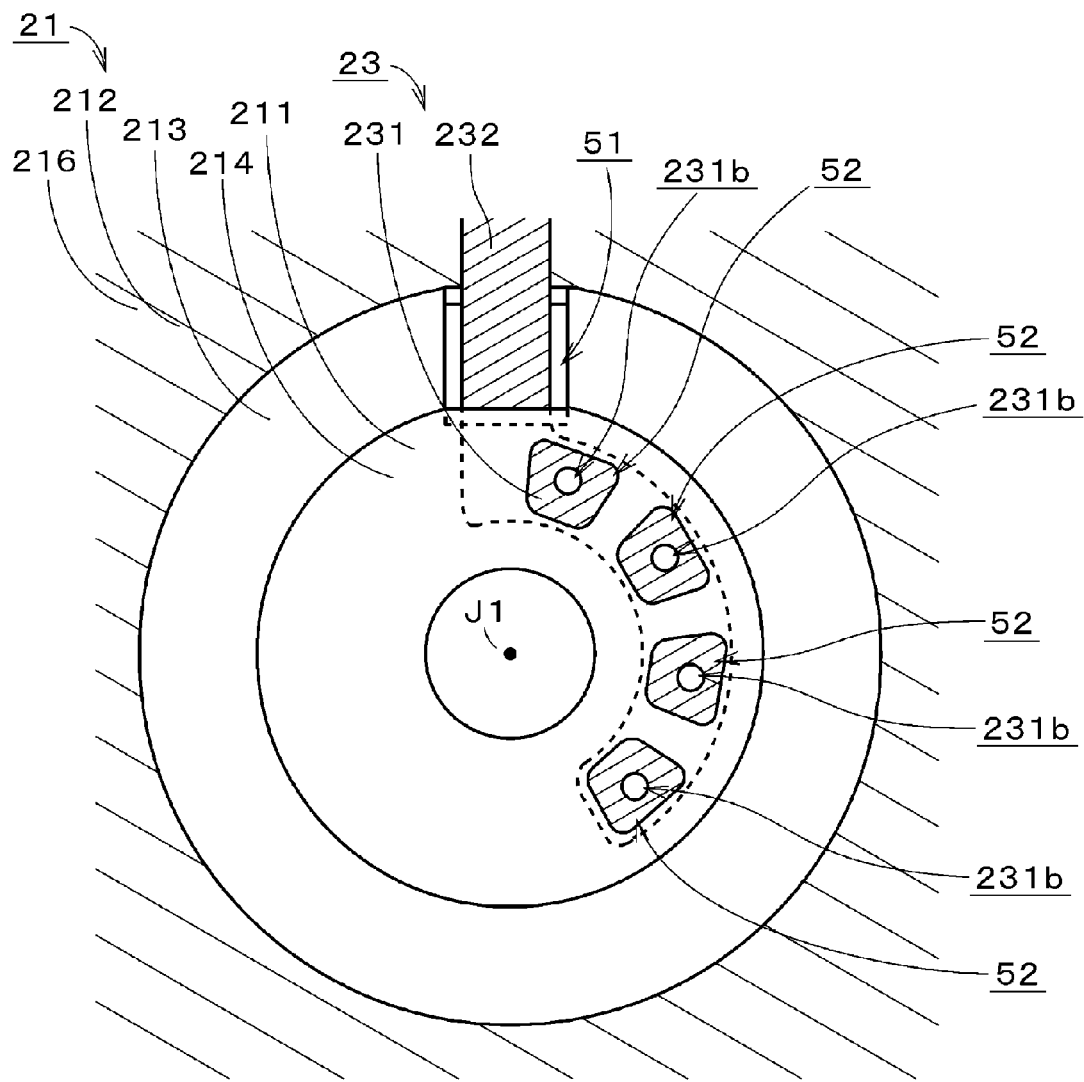
FIG. 3 is a bottom view showing a base portion and a substrate in accordance with a preferred embodiment of the present invention.

FIG. 3 is a bottom view illustrating only the base plate 21 and the substrate 23 of the motor 12. In FIG. 3, the substrate 23 is hatched by slanted parallel lines with a narrow gap. This also holds true in FIG. 7. As shown in FIGS. 2 and 3, the lower surface of the base plate 21 preferably includes a portion 213 inclined upward from the outer edge of the central portion 211 toward the radial outer side. In the following description, the portion 213 will be referred to as "step portion 213". The step portion 213 is preferably provided by a substantially annular shape about the center axis J1. A portion 212 existing radially outward of the step portion 213 is positioned higher than the central portion 211. In the following description, the portion 212 will be referred to as "peripheral portion 212". In FIG. 3, the peripheral portion 212 is hatched by slanted parallel lines with a wide gap. The expression "step portion" refers to a step-shaped portion including the periphery of the portion 213. For the sake of convenience in description, the portion 213 will be called "step portion" herein. The portion arranged higher than the step portion 213 corresponds to the peripheral portion 212. The portion arranged lower than the step portion 213 corresponds to the central portion 211.

Figure 4:
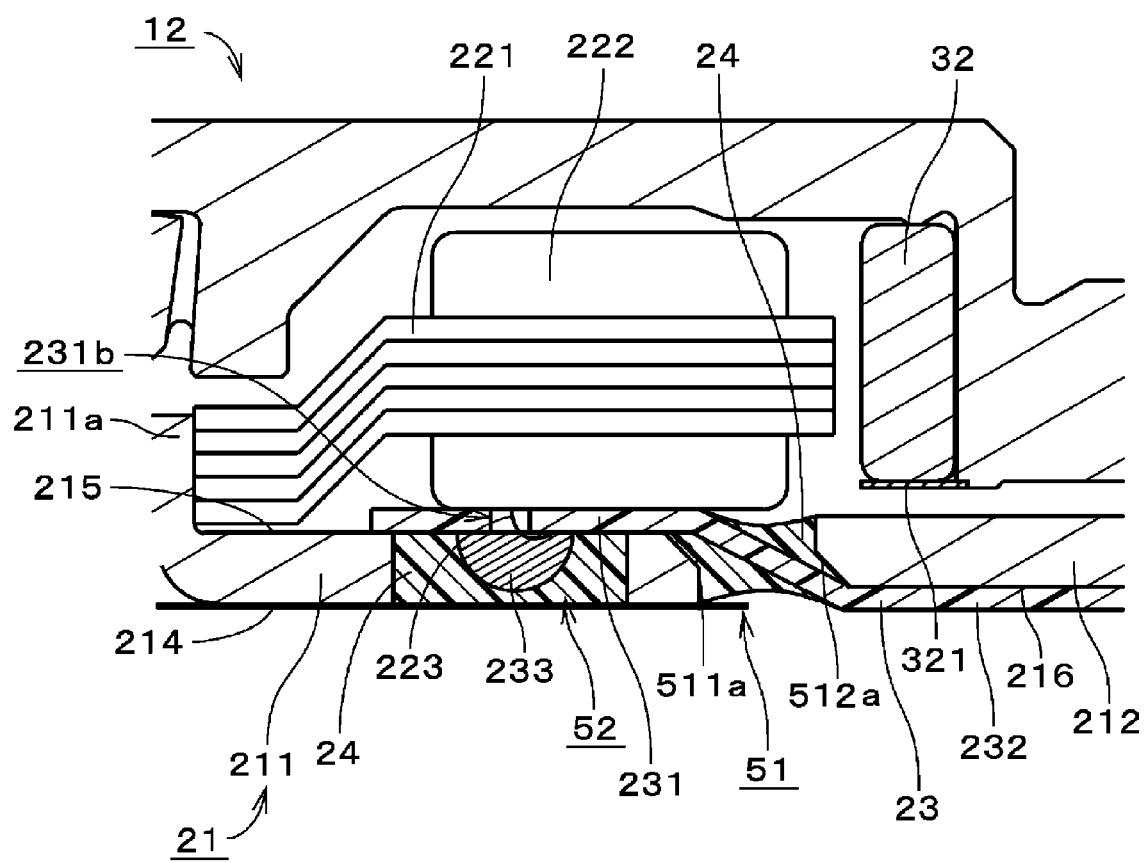
FIG. 4 is a sectional view of the motor in accordance with a preferred embodiment of the present invention.

The central portion 211 is preferably provided with a plurality of solder reception holes 52. The solder reception holes 52 are positioned radially inward of the substrate insertion hole 51. As shown in FIG. 3, the substrate insertion hole 51 axially overlaps with the step portion 213. The lower opening of the substrate insertion hole 51 is included in the step portion 213. FIG. 4 is a sectional view showing the substrate 23 of the motor 12 and the surrounding structures on an enlarged scale. The substrate insertion hole 51 is preferably positioned radially inward of the rotor magnet 32.

As shown in FIGS. 3 and 4, the substrate 23 preferably includes a connection portion 231 and a lead portion 232. The connection portion 231 preferably is substantially arc-shaped about the center axis J1. The connection portion 231 preferably includes a plurality of outlet holes 231b extending through the connection portion 231. The outlet holes 231b preferably axially overlap with the solder reception holes 52.

The lower surface of the connection portion 231 shown in FIG. 4 is preferably bonded to the surrounding regions of the solder reception holes 52 on the upper surface 215 of the central portion 211. All the solder reception holes 52 preferably overlap with the connection portion 231 in the up-down direction. The upper surface of the connection portion 231 contacts the lower portions of the coils 222. An insulation film is preferably provided on the upper surface of the connection portion 231, thereby providing insulation between the connection portion 231 and the coils 222. Lead wires 223 led out from the coils 222 extend through the outlet holes 231b and are soldered to the lower surface of the connection portion 231. The tip end portions of the lead wires 223 are covered by solder portions 233, i.e., solder masses, which are arranged on the lower surface of the connection portion 231. The outlet holes 231b are preferably closed by the solder portions 233. All the solder portions 233 are positioned within the solder reception holes 52. Preferably, an adhesive agent 24 exists in the entire regions of the solder reception holes 52 and the substrate insertion hole 51. This prevents a gas from flowing into and out of the disk drive apparatus through the solder reception holes 52 and the substrate insertion hole 51.

As shown in FIGS. 3 and 4, the upper surface of the lead portion 232 is arranged on the step portion 213 and the lower surface 216 of the peripheral portion 212. Preferably, the lead portion 232 is adhesively bonded to the step portion 213 and the lower surface 216 of the peripheral portion 212 by a double-side tape or a sticky material, for example. The axial distance between the lower surface 216 of the peripheral portion 212 and the lower surface 214 of the central portion 211, i.e., the lowermost surface of the base plate 21, is preferably equal to or larger than the axial thickness of the lead portion 232. This configuration helps prevent the lead portion 232 from protruding downward beyond the lowermost surface of the base plate 21. Alternatively, the upper surface of the lead portion 232 may be bonded to the step portion 213 and the lower surface 216 of the peripheral portion 212 by an adhesive agent, for example.

As stated above, the substrate insertion hole 51 shown in FIG. 4 is preferably positioned radially inward of the rotor magnet 32. This prevents the substrate 23 from getting closer to the rotor magnet 32. As a result, it is possible to prevent the rotor magnet 32 from magnetically affecting the substrate 23.

Since an annular plate 321 as a magnetic member is arranged on the lower surface of the rotor magnet 32, it is possible to prevent the magnetic flux from being leaked downward from the rotor magnet 32. This configuration makes it possible to further prevent the rotor magnet 32 from magnetically affecting the substrate 23.

Figure 5:
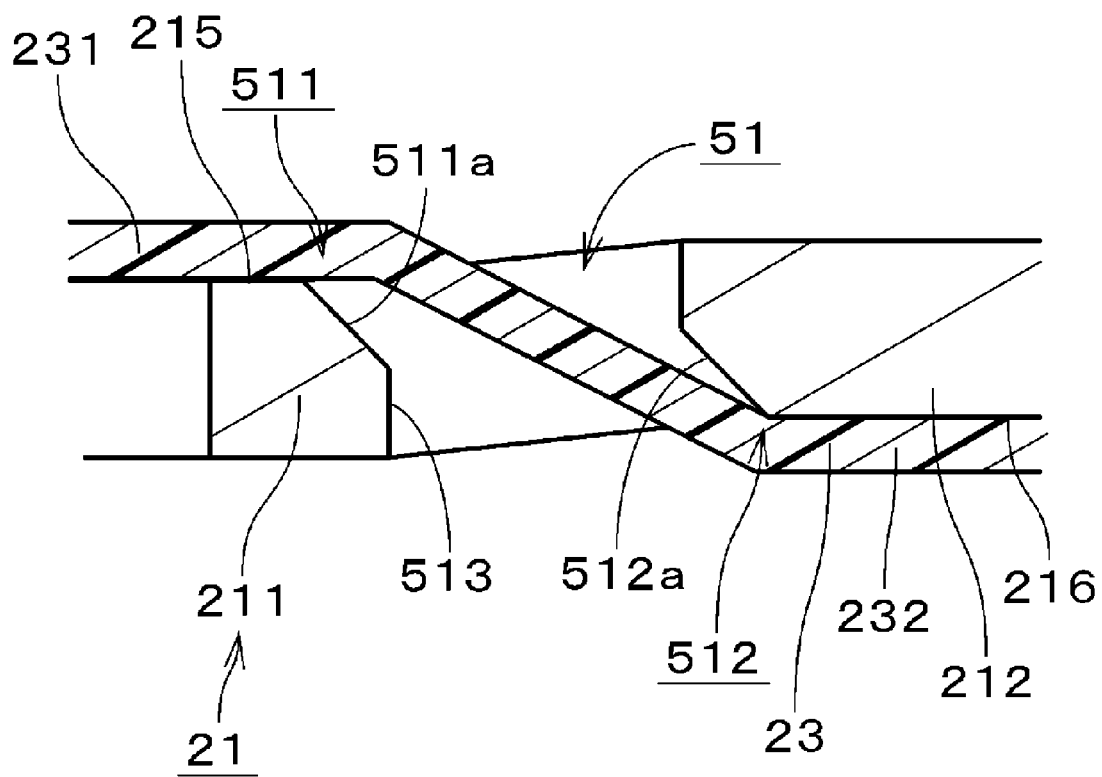
FIG. 5 is a sectional view showing a substrate insertion hole in accordance with a preferred embodiment of the present invention on an enlarged scale.

FIG. 5 is a view showing the substrate insertion hole 51 of the base plate 21 on an enlarged scale. The adhesive agent is not shown in FIG. 5. In the following description, the edge of the substrate insertion hole 51 near the upper surface 215 of the central portion 211, i.e., the edge of the substrate insertion hole 51 near the connection portion 231 of the substrate 23, will be referred to as "upper edge 511". The edge of the substrate insertion hole 51 near the lower surface 216 of the peripheral portion 212, i.e., the edge of the substrate insertion hole 51 near the lead portion 232 of the substrate 23, will be referred to as "lower edge 512". The upper edge 511 preferably includes a slanted surface 511a connected to the upper surface 215 of the central portion 211 and the inner circumferential surface 513 of the substrate insertion hole 51 parallel or substantially parallel to the center axis J1. The lower edge 512 preferably includes a slanted surface 512a connected to the lower surface 216 of the peripheral portion 212 and the inner circumferential surface 513 of the substrate insertion hole 51.

When assembling the stationary unit 2, the lead portion 232 is preferably inserted into the substrate insertion hole 51 from the upper side thereof. The connection portion 231 and the lead portion 232 are disposed on the upper surface 215 of the central portion 211 and the lower surface 216 of the peripheral portion 212, respectively. Next, the stator core 221 shown in FIG. 4 is inserted into the stator fixing portion 211a. The lead wires 223 of the coils 222 are inserted into the outlet holes 231b of the connection portion 231. The lead wires 223 are soldered to the connection portion 231 within the solder reception holes 52. The solder portions 233 close up the outlet holes 231b. The adhesive agent 24 is filled in the entire regions of the solder reception holes 52, thereby sealing the solder reception holes 52. Similarly, the substrate insertion hole 51 is sealed by the adhesive agent 24. In the motor 12, the slanted surfaces 511a and 512a defined in the substrate insertion hole 51 make it possible to easily insert the lead portion 232 into the substrate insertion hole 51.

In the motor 12, the connection portion 231 of the substrate 23 is connected to the stator 22 at the upper side of the lower surface 214 of the central portion 211 of the base plate 21. The solder portions 233 defined in the connection portion 231 overlap with the solder reception holes 52 in the up-down direction. Accordingly, even if the height of the motor 12 is reduced, the solder portions 233 are prevented from protruding downward from the base plate 21. The upper surface and the lower surface of the connection portion 231 are axially bonded to the coils 222 and the base plate 21, respectively. This makes it possible to prevent the substrate 23 from moving in the up-down direction and to fix the position of the substrate 23. Inasmuch as the substrate insertion hole 51 is positioned radially inward of the rotor magnet 32, the lead portion 232 is preferably prevented from getting closer to the rotor magnet 32. This makes it possible to prevent the rotor magnet 32 from magnetically affecting the substrate 23.

Since the step portion 213 is formed into an annular shape by, for example, a press work, the distance between the section of the upper surface of the base plate 21 corresponding to the step portion 213 and the rotor magnet 32 is preferably prevented from varying in the circumferential direction. As a consequence, it is possible to prevent a generation of a circumferential deviation in the magnetic attraction force acting between the base plate 21 and the rotor magnet 32.

Figure 6:
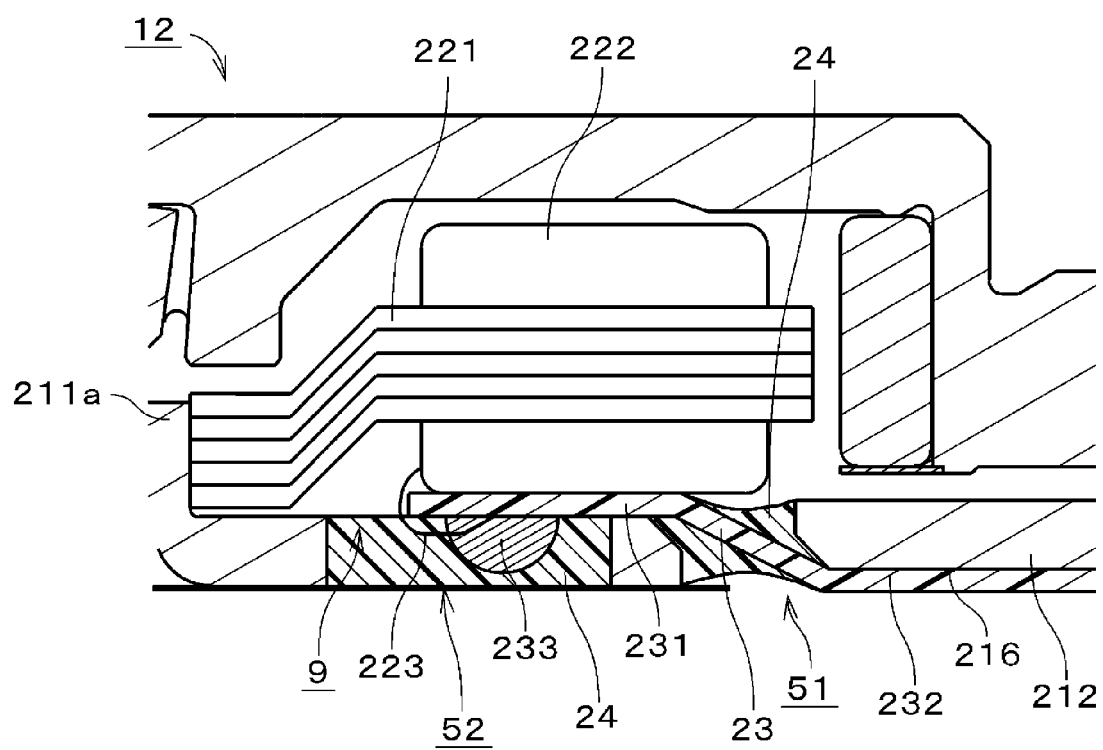
FIG. 6 is a sectional view showing a motor according to one modified example of a preferred embodiment of the present invention.
Figure 7:
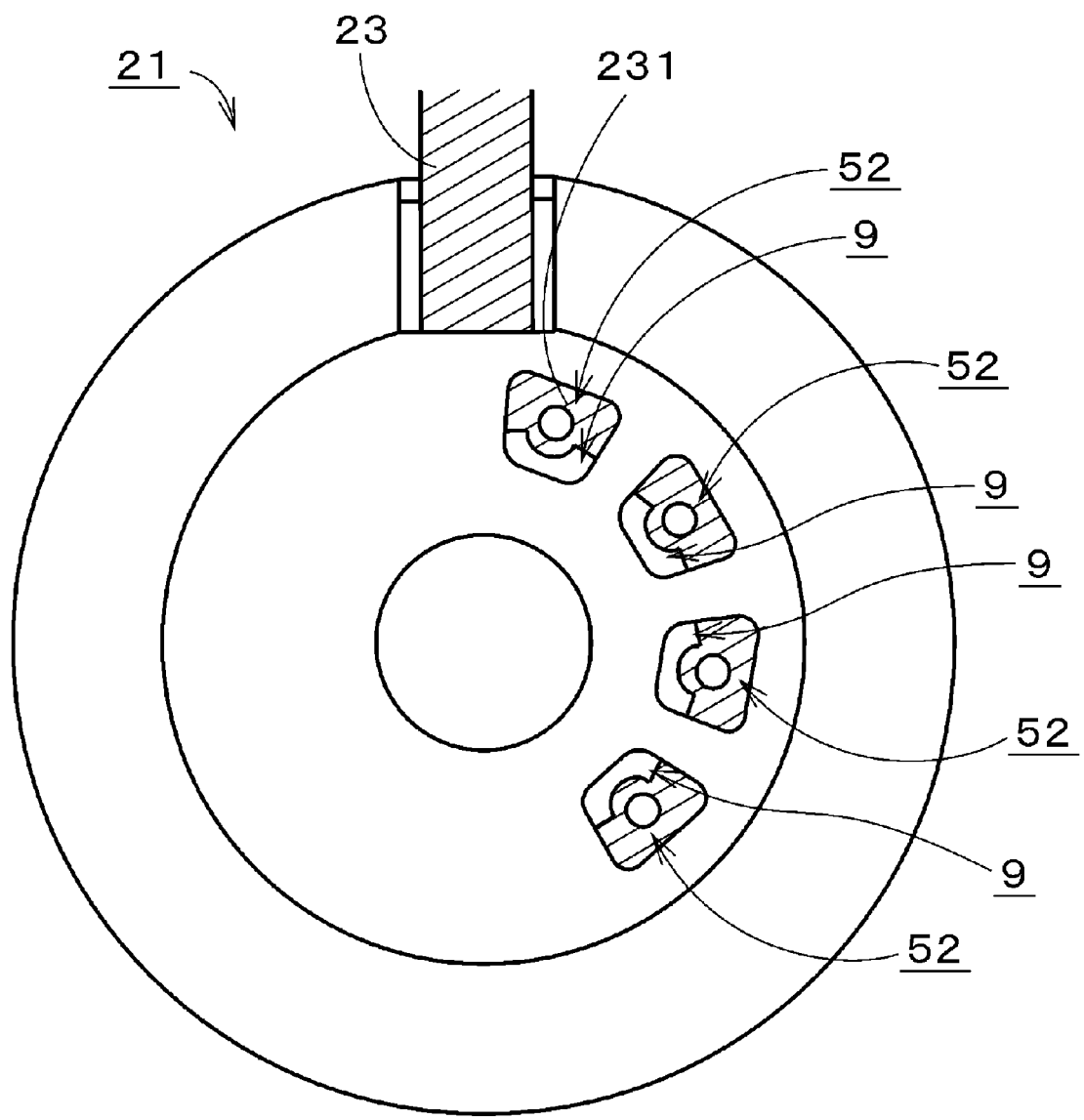
FIG. 7 is a bottom view showing a base plate and a substrate in accordance with a preferred embodiment of the present invention.

FIG. 6 is a sectional view showing a motor according to one modified example of a preferred embodiment of the present invention. FIG. 7 is a bottom view showing the base plate 21 and the substrate 23 of the motor 12. A gap 9 is defined between the inner end of the connection portion 231 of the substrate 23 and the radial inner edge of each of the solder reception holes 52.

When assembling the stationary unit 2, the upper surface of the connection portion 231 shown in FIG. 6 is first adhesively bonded to the coils 222. The lead wires 223 are soldered to the lower surface of the connection portion 231. Next, the stator core 221 is preferably inserted into the stator fixing portion 211a. At this time, the lead portion 232 is preferably inserted into the substrate insertion hole 51. The lead portion 232 is arranged on the lower surface 216 of the peripheral portion 212. Since the gaps 9 are defined between the inner end of the connection portion 231 and the radial inner edges of the solder reception holes 52, the lead wires 223 are positioned within the solder reception holes 52 through the gaps 9. The solder portions 233 are positioned within the solder reception holes 52. Preferably, an adhesive agent 24 having an increased viscosity is filled in the solder reception holes 52, thereby sealing the solder reception holes 52. Similarly, the substrate insertion hole 51 is sealed by the adhesive agent 24. In the motor 12 shown in FIG. 6, it is equally possible to reduce the height of the motor 12 by positioning the solder portions 233 within the solder reception holes 52. While the upper surface of the connection portion 231 is preferably adhesively bonded to the coils 222, the present invention is not limited thereto. For example, the lower surface of the connection portion 231 may be adhesively bonded to the upper surface 215 of the central portion 211.

Figure 8:
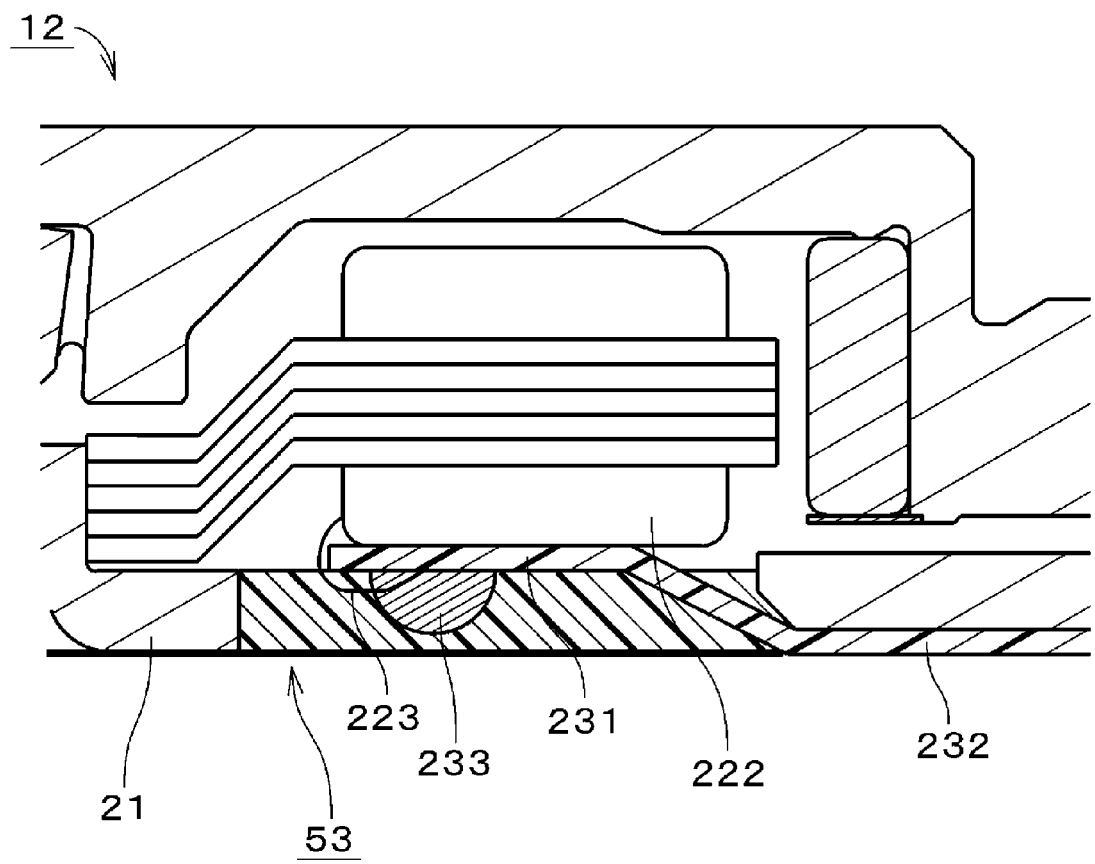
FIG. 8 is a sectional view showing a motor according to another modified example of a preferred embodiment of the present invention.

FIG. 8 is a sectional view showing a motor according to another modified example of a preferred embodiment of the present invention. A single large substrate insertion hole 53 is preferably defined in the base plate 21. The connection portion 231 is preferably adhesively bonded to the lower portions of the coils 222. The lead portion 232 is preferably arranged below the base plate 21 through the substrate insertion hole 53. The lead wires 223 led out from the coils 222 are soldered to the lower surface of the connection portion 231. All the solder portions 233 are positioned within the substrate insertion hole 53. In the motor 12 shown in FIG. 8, the substrate insertion hole 53 also serves as a solder reception hole.

In the motor 12 described above, the base plate 21 preferably has at least one hole extending through the base plate in the up-down direction. Accordingly, it is possible to guide the lead portion 232 to the lower surface of the base plate while arranging the connection portion 231 higher than the lower surface of the base plate 21. It is also possible to have the solder portions 233 positioned within the hole. With this configuration, a reduction in the height of the motor 12 is achieved. This holds true in all of the preferred embodiments to be described later.

Figure 9:
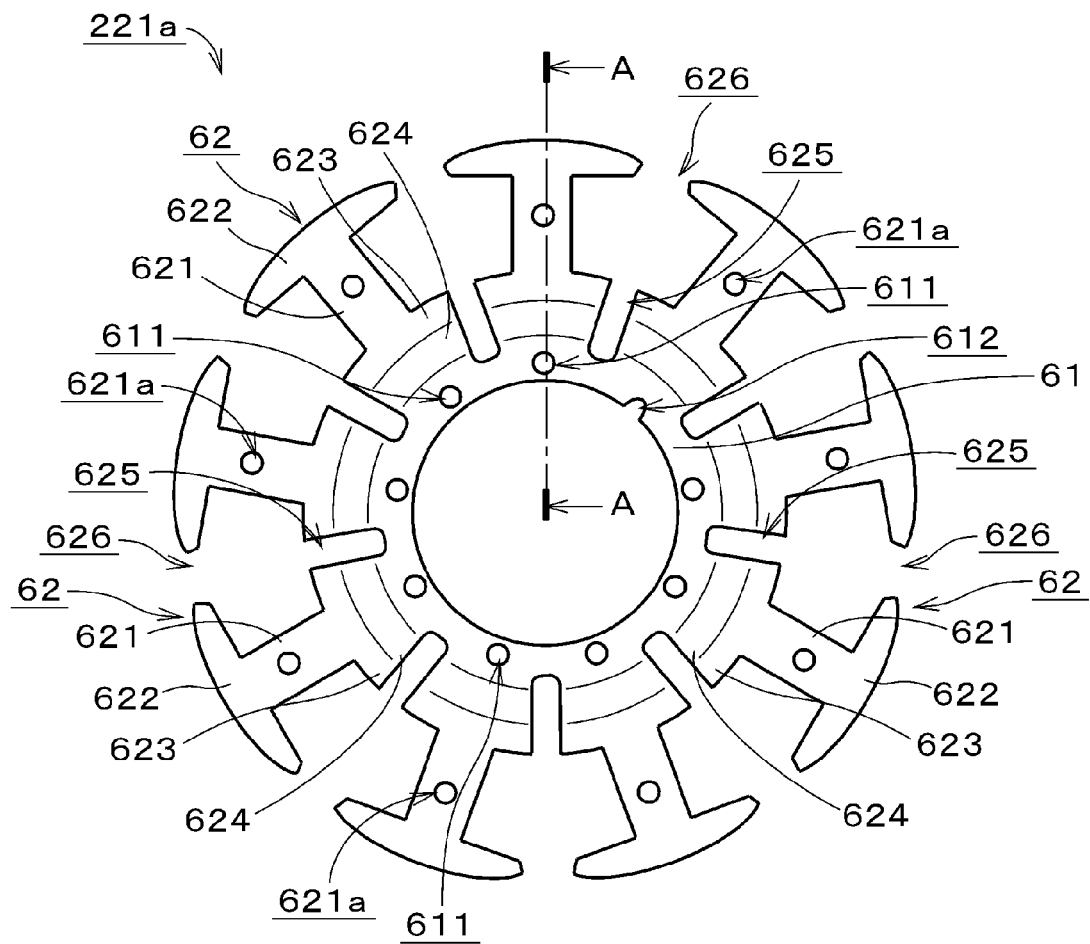
FIG. 9 is a plan view showing a stator core of a motor according to another preferred embodiment of the present invention.
Figure 10:
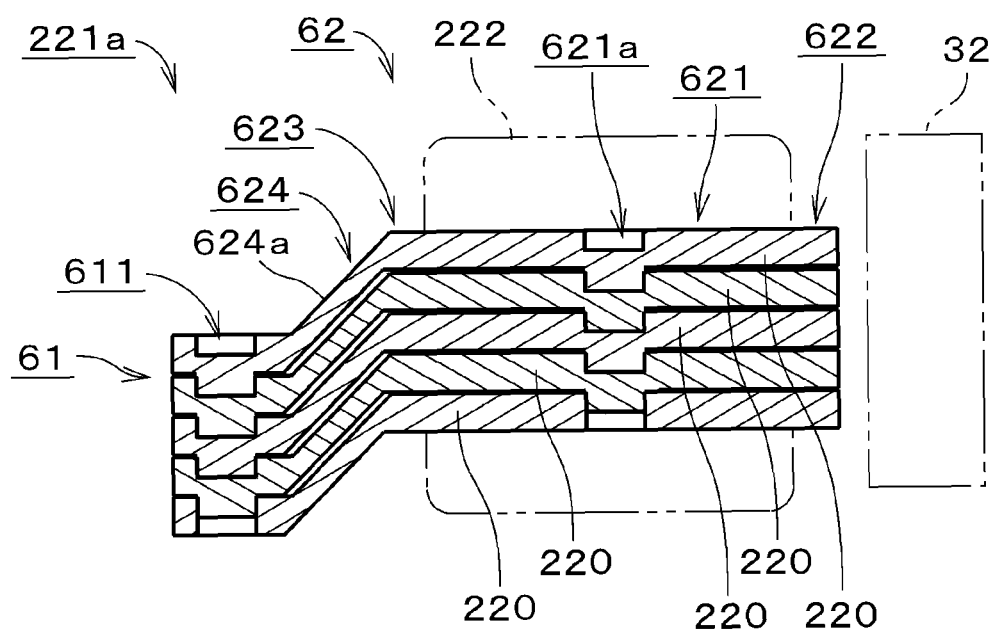
FIG. 10 is a sectional view of the stator core in accordance with a preferred embodiment of the present invention.

FIG. 9 is a plan view showing a stator core 221a of a motor according to another related preferred embodiment of the present invention. The structures of the motor other than the stator core 221a remain the same as the structures of the motor 12 shown in FIG. 2. The stator core 221a preferably includes an annular core-back 61 and a plurality of teeth portions 62. In this regard, the core-back 61 refers to the annular portion of the stator core 221a existing radially inward of the inner ends of the gaps defined between the teeth portions 62. FIG. 10 is a sectional view of the stator core 221a taken along line A-A in FIG. 9. The right side in FIG. 10 corresponds to the radial outer side of the stator core 221a. The stator core 221a preferably includes a plurality of electromagnetic steel plates 220 preferably formed by, for example, a press. In the following description, the electromagnetic steel plates 220 will be called "core members 220".

The core-back 61 shown in FIGS. 9 and 10 is preferably fixed by, for example, an adhesive agent to the outer circumferential surface of the stator fixing portion 211a shown in FIG. 2. The teeth portions 62 extend radially outward from the core-back 61. Each of the teeth portions 62 preferably includes a coil winding portion 621, a tip end portion 622, and an increased width portion 623. The coil winding portion 621 preferably is formed into a substantially straight shape to extend in the radial direction. A coil 222 indicated by a double-dot chain line in FIG. 10 is wound on the coil winding portion 621. The tip end portion 622 is preferably circumferentially widened from the radial outer end of the coil winding portion 621. The increased width portion 623 is preferably arranged between the coil winding portion 621 and the core-back 61 and provided as a single monolithic piece with the coil winding portion 621 and the core-back 61. The tip end portion 622 and the increased width portion 623 are preferably larger in circumferential width than the coil winding portion 621.

The coil winding portion 621 preferably includes a caulking portion 621a arranged to fix a plurality of core members 220 together by caulking. The core-back 61 preferably includes a plurality of caulking portions 611 and a cutout portion 612 shown in FIG. 9. The caulking portions 611 are configured to fix the core members 220 together by caulking. Since the coil winding portion 621 and the core-back 61 of the stator core 221a are respectively provided with the caulking portion 621a and the caulking portions 611, the core members 220 are strongly fixed together. This helps prevent the core members 220 from being separated from one another in the teeth portions 62 and the core-back 61.

As shown in FIG. 9, the cutout portion 612 is preferably depressed radially outward from the inner circumferential surface of the core-back 61. When the core members 220 are axially stacked one above another as shown in FIG. 10, the cutout portion 612 is used as a mark which positions the core members 220 in the circumferential direction. A slit 625 extends radially between the increased width portions 623 adjoining to each other. The slit 625 preferably radially overlaps with a slot gap 626 defined between the tip end portions 622 adjoining to each other. The circumferential maximum width of the slit 625 is preferably smaller than the width, i.e., the minimum width, of the slot gap 626. Alternatively, the maximum width of the slit 625 may be equal or approximately equal to the width of the slot gap 626.

As shown in FIG. 10, the increased width portion 623 preferably includes a slanted portion 624 extending radially outward and upward from the core-back 61. In the following description, the surface 624a of the slanted portion 624 existing at the upper side in FIG. 10, i.e., the surface whose normal line is inclined radially inward, namely leftward in FIG. 10, and upward, will be referred to as "upper surface 624a". The slanted portion 624 is preferably formed by, for example, bending the stator core 221a with a press. The thickness of the slanted portion 624 in the direction perpendicular or substantially perpendicular to the upper surface 624a of the slanted portion 624 is smaller than the axial thickness of the coil winding portion 621 and the core-back 61. More precisely, the total thickness of the portions of the core members 220 defining the slanted portions 624 is preferably smaller than the total thickness of the portions of the core members 220 defining the coil winding portions 621 and the core-backs 61. As a result, the thickness of the slanted portion 624 that is actually used as a magnetic path becomes small.

Figure 11:
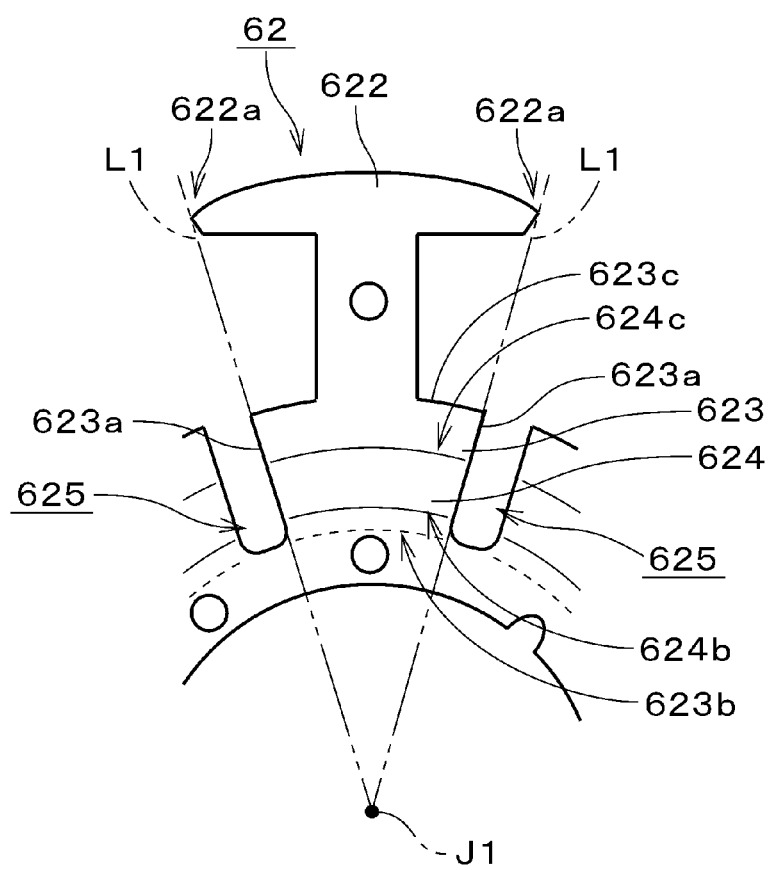
FIG. 11 is a plan view of the stator core in accordance with a preferred embodiment of the present invention.

FIG. 11 is an enlarged view showing the teeth portion positioned at the upper side in FIG. 9. The inner edge section 624b of the slanted portion 624 is positioned radially outward of the inner edge section 623b of the increased width portion 623, i.e., radially outward of the section existing between the inner ends of the two adjoining slits 625. In FIG. 11, the inner edge section 623b of the increased width portion 623 is indicated by a broken line. The outer edge section 624c of the slanted portion 624 and the outer edge section 623c of the increased width portion 623 are preferably arc-shaped about the center axis J1. The circumferential width of the tip end portion 622 is a slanted portion larger than the circumferential maximum width of the increased width portion 623. When seen in a plan view, the circumferentially opposite end sections 623a of the increased width portion 623 are positioned on the straight lines L1 interconnecting the center axis J1 and the circumferentially opposite ends 622a of the tip end portion 622.

Since the stator core 221a is provided with the slanted portion 624 as shown in FIG. 10, the tip end portion 622 is positioned higher than the core-back 61. With this configuration, the axial existence range of the tip end portion 622 can radially overlap with the axial position of the magnetic center of the rotor magnet 32 indicated by a double-dot chain line.

As set forth above, the thickness of the slanted portion 624 in the direction perpendicular or substantially perpendicular to the upper surface 624a is smaller than the axial thickness of the coil winding portion 621 and the core-back 61. Nevertheless, the magnetic path can be secured in the stator core 221a by securing the circumferential width of the slanted portion 624. It is also possible to secure the strength of the teeth portions 62 and to reduce vibration of the stator 22. In the motor 12, the provision of the increased width portion 623 makes it possible to prevent the winding of the coils 222 from collapsing.

Inasmuch as the inner edge section 624b of the slanted portion 624 is positioned radially outward of the inner edge section 623b of the increased width portion 623, it is possible to easily bend the stator core 221a as compared with a stator core having no slit.

Figure 12:
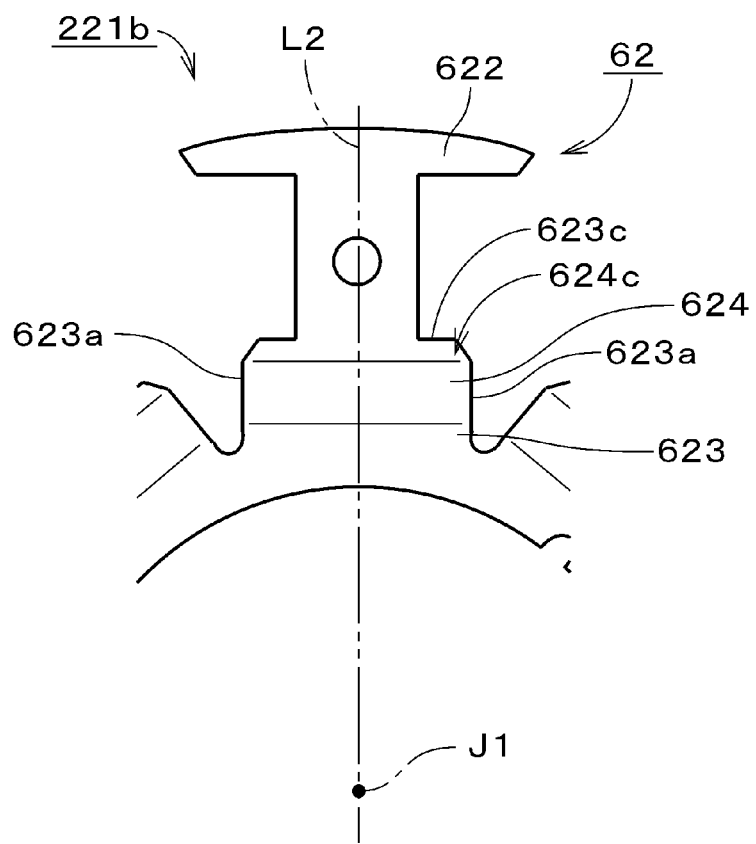
FIG. 12 is a plan view of a stator core of a motor according to a further related preferred embodiment of the present invention.

FIG. 12 is an enlarged view showing a teeth portion 62 of a stator core 221b of a motor 12 according to a further related preferred embodiment of the present invention. When seen in a plan view, the circumferentially opposite end sections 623a of the increased width portion 623 are parallel or substantially parallel to the straight line L2 interconnecting the center axis J1 and the center of the tip end portion 622. The outer edge section 624c of the slanted portion 624 and the outer edge section 623c of the increased width portion 623 preferably have a linear shape perpendicular or substantially perpendicular to the straight line L2 when seen in a plan view.

Figure 13:
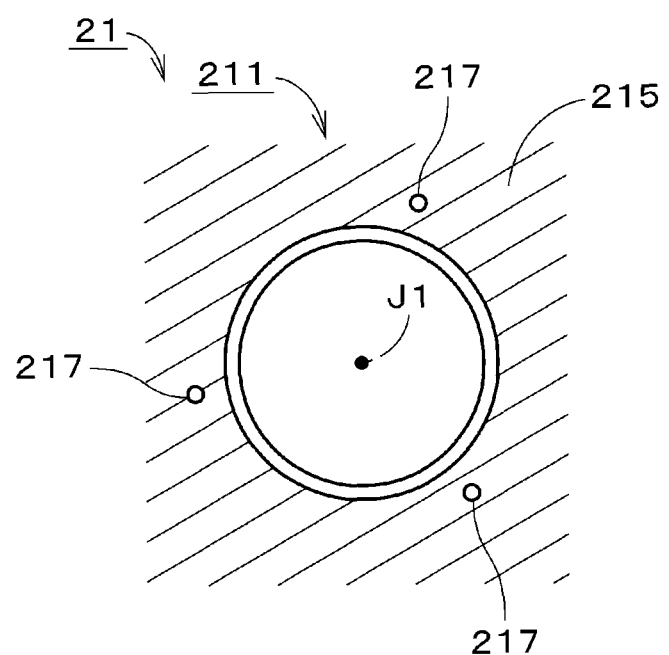
FIG. 13 is a plan view of a base plate in accordance with a preferred embodiment of the present invention.

FIG. 13 is a plan view showing the central portion 211 of the base plate 21. In FIG. 13, the upper surface 215 of the base plate 21 is hatched by parallel slanted lines. This holds true in FIG. 14. The central portion 211 preferably includes a plurality of protrusions 217 protruding upward from the upper surface 215. The protrusions 217 are preferably formed by, for example, subjecting the base plate 21 to half blanking. The angle between the two adjoining protrusions 217 about the center axis J1 is preferably equal to or larger than about 90 degrees and smaller than about 180 degrees. Other structures of the motor 12 remain the same as the structures of the motor 12 shown in FIG. 2.

Figure 14:
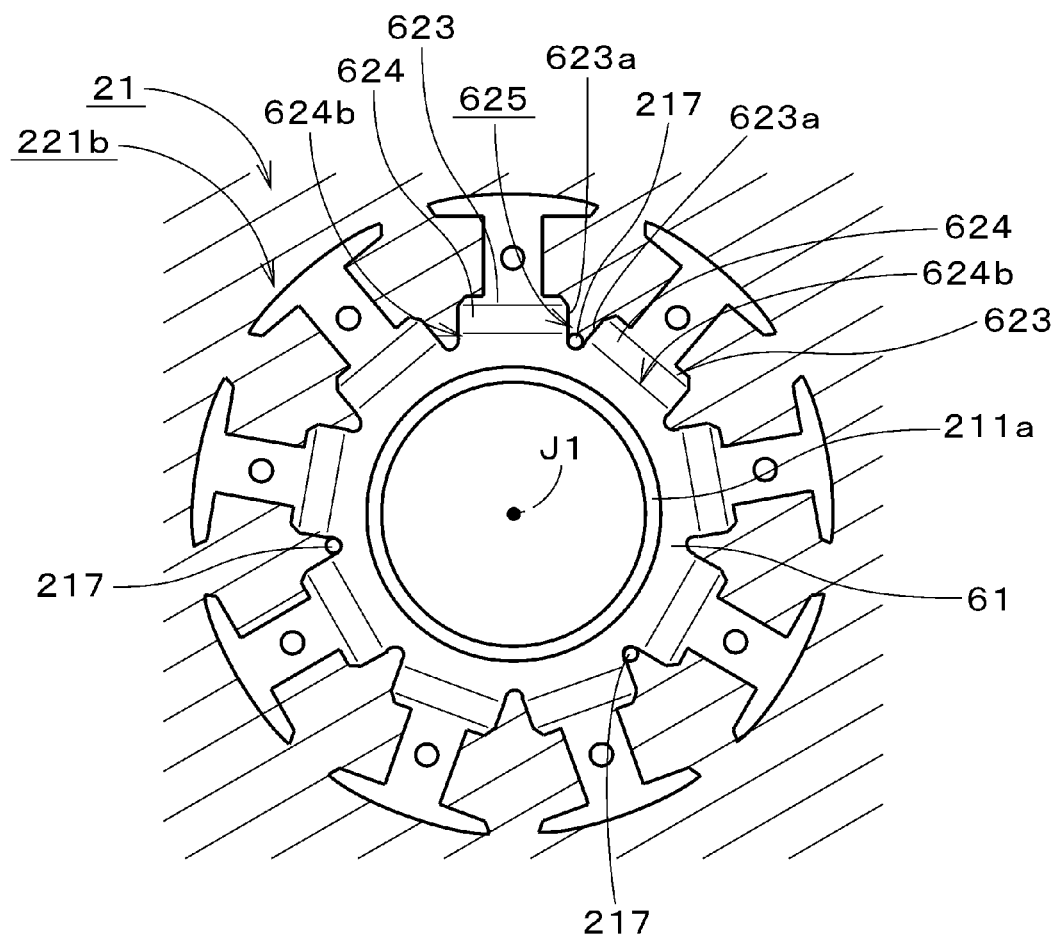
FIG. 14 is a plan view of the base plate and the stator core in accordance with a preferred embodiment of the present invention.

FIG. 14 is a plan view showing the stator core 221b attached to the base plate 21. The protrusions 217 are inserted into the slits 625 defined between the increased width portions 623 of the stator core 221b. The protrusions 217 are positioned radially inward of the inner edge section 624b of the slanted portion 624 to circumferentially engage with the circumferentially opposite end sections 623a of the increased width portions 623. With this configuration, the position of the stator core 221b relative to the base plate 21 can be easily decided within the plane perpendicular or substantially perpendicular to the center axis J1.

In the motor 12, the magnetic path can be secured in the stator core 221b by securing the circumferential width of the slanted portion 624. It is also possible to secure the strength of the teeth portions 62. This also holds true in the preferred embodiments to be described later.

In the motor 12, even if a gap exists between the core-back 61 and the stator fixing portion 211a, there is no need to perform positioning of the stator core 221b relative to the base plate 21 through the use of a jig. With this configuration, it is possible to efficiently assemble the motor 12. In particular, if the base plate 21 including the stator fixing portion 211a preferably is a single monolithic piece formed by, for example, a press work, the form error of the stator fixing portion 211a grows larger. This makes it necessary to leave a gap between the core-back 61 and the stator fixing portion 211a. Accordingly, it is advisable to include the protrusions 217 in case where the base plate 21 is formed by a press work.

Figure 15:
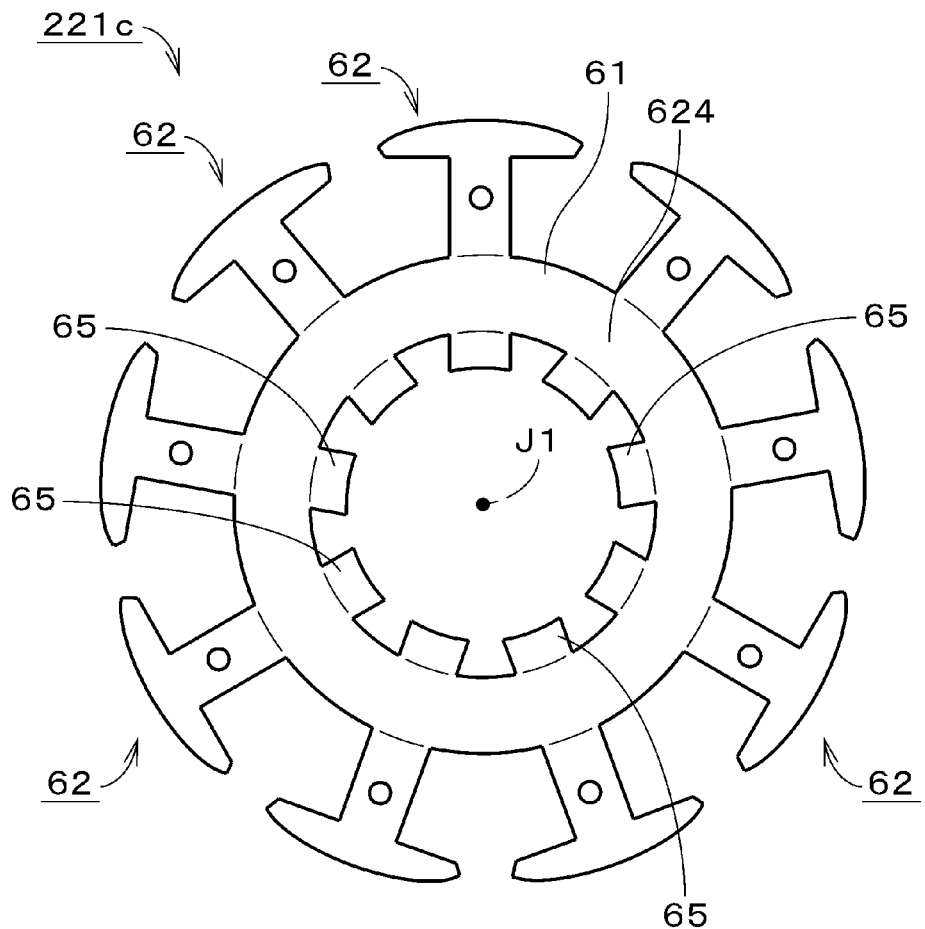
FIG. 15 is a plan view showing another example of the stator core in accordance with a preferred embodiment of the present invention.

FIG. 15 is a plan view showing another example of the stator core 221c in accordance with a preferred embodiment of the present invention. In the stator core 221c, there are preferably no increased width portions provided in any of the teeth portions 62. The stator core 221c preferably includes an annular core-back 61, a plurality of teeth portions 62, and a plurality of lug portions 65. The lug portions 65 extend radially inward from the core-back 61 within the plane perpendicular or substantially perpendicular to the center axis J1. The lug portions 65 are preferably fixed by, for example, an adhesive agent to the outer circumferential surface of the stator fixing portion 211a shown in FIG. 4. The lug portions 65 contact the upper surface 215 of the base plate 21 in the axial direction.

The core-back 61 is preferably a slanted portion 624 extending radially outward and upward. Just like the slanted portion 624 shown in FIG. 10, the thickness of the core-back 61 in the direction perpendicular or substantially perpendicular to the upper surface of the core-back 61 is smaller than the axial thickness of the coil winding portion 621. Due to the provision of the core-back 61 as the slanted portion 624, the axial existence range of the tip end portion 622 can radially overlap with the axial position of the magnetic center of the rotor magnet 32 as in the case of FIG. 10.

Figure 16:
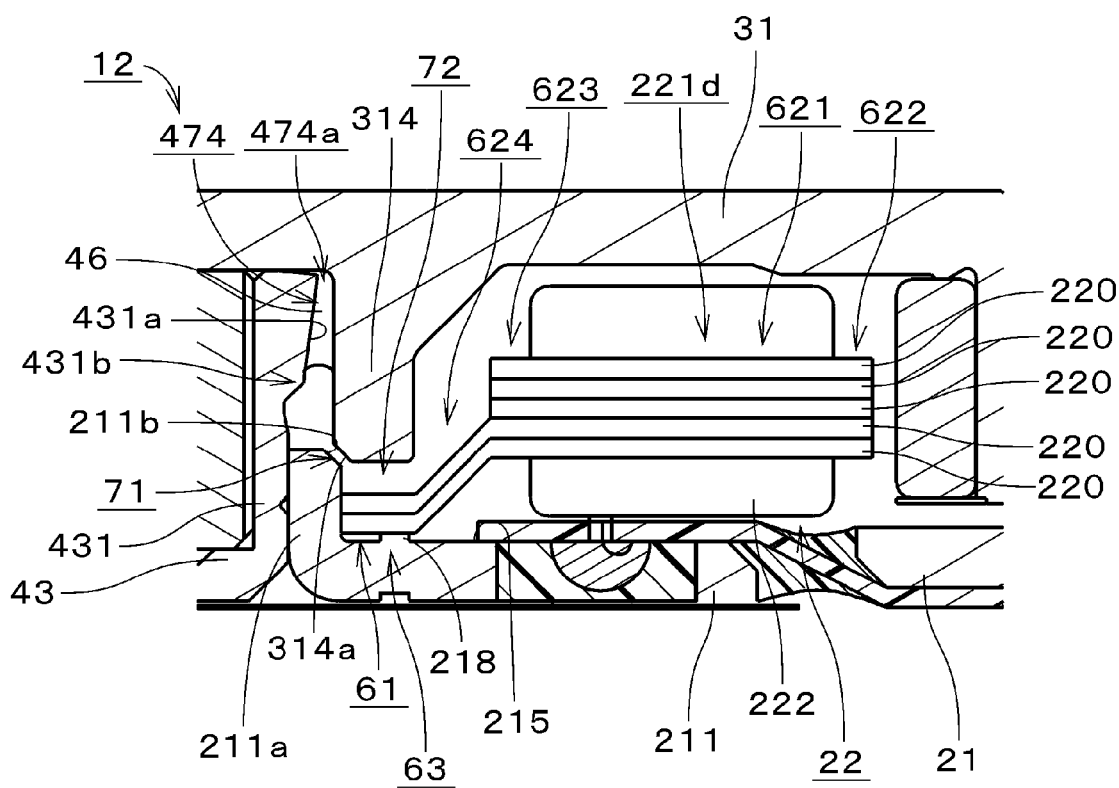
FIG. 16 is a sectional view showing a motor according to a first preferred embodiment of the present invention.

FIG. 16 is a sectional view showing a motor 12 according to a first preferred embodiment of the present invention. In the motor 12, the number of core members 220 defining the core-back 61 of the stator core 221d and the section of the increased width portion 623 existing radially inward of the upper end of the slanted portion 624 is preferably two, for example. The number of core members 220 defining the coil winding portion 621, the tip end portion 622, and the section of the increased width portion 623 existing radially outward of the upper end of the slanted portion 624 is preferably five, for example. Other structures of the stator core 221d preferably are the same as the structures of the stator core 221a shown in FIG. 10.

The portion 63 of the stator core 221d provided radially inward of the lower end of the slanted portion 624, namely the section of the increased width portion 623 and the core-back 61 provided radially inward of the slanted portion 624, is arranged below the hub portion 314 of the rotor hub 31. In the following description, the portion 63 will be referred to as "inner peripheral portion 63". The core-back 61 preferably axially contacts a projection 218 defined on the upper surface 215 of the central portion 211 of the base plate 21. The upper end of the stator fixing portion 211a is preferably positioned inward of the hub portion 314 and upward of the lower end of the hub portion 314. The lower section of the inner circumferential surface of the hub portion 314 preferably includes a slanted surface 314a inclined radially outward and downward. The upper section of the outer circumferential surface of the stator fixing portion 211a preferably includes a slanted surface 211b inclined radially outward and downward.

A slanted gap 71 inclined radially outward and downward is preferably defined between the slanted surface 314a of the hub portion 314 and the slanted surface 211b of the stator fixing portion 211a. In the following description, the slanted gap 71 will be referred to as "first communication gap 71". A second communication gap 72 radially widened from the first communication gap 71 is defined between the lower end of the hub portion 314 and the inner peripheral portion 63 of the stator core 221d axially opposed to the hub portion 314. Preferably, the radial width of the second communication gap 72 is a little larger than the radial width of the core-back 61 shown in FIG. 9, namely the radial width between the inner edge section of the core-back 61 and the inner end of the slit 625.

The sleeve housing 43 preferably includes a slanted surface 431a provided in the upper section of the outer circumferential surface of the cylinder portion 431 and inclined radially inward and downward. A substantially cylindrical cylinder gap 474 is defined between the slanted surface 431a and the inner circumferential surface of the hub portion 314. A seal region 474a in which the boundary surface of a lubricant 46 is preferably provided is defined in the cylinder gap 474. The cylinder gap 474 is connected to a space around the stator 22 via the first communication gap 71 and the second communication gap 72. The width of the first communication gap 71 is preferably smaller than the radial maximum width of the cylinder gap 474 at the lower end 431b of the slanted surface 431a.

In the motor 12, the provision of the first communication gap 71 and second communication gap 72 makes it possible to prevent or substantially prevent the lubricant 46 from being vaporized from the seal region 474a. Since the width of the first communication gap 71 is smaller than the radial maximum width of the cylinder gap 474, it is possible to further prevent vaporization of the lubricant 46.

By reducing the axial thickness of the core-back 61, it becomes possible to arrange the core-back 61 in a narrow space between the hub portion 314 and the base plate 21, thereby reducing the size of the motor 12. By making the axial thickness of the coil winding portion 621 larger than the axial thickness of the core-back 61, it is possible to improve the electromagnetic characteristics.

Figure 17:
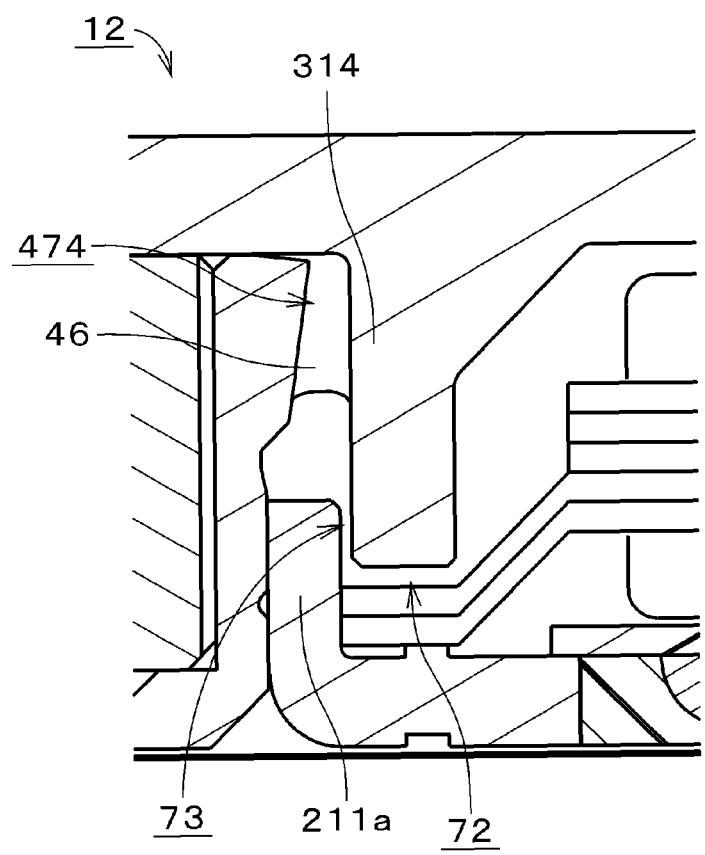
FIG. 17 is a sectional view showing a motor according to one modified example of the first preferred embodiment of the present invention.

FIG. 17 is a view showing a motor according to one modified example of a preferred embodiment of the present invention. In the motor 12, a first communication gap 73, i.e., an axially-extending vertical gap, is defined between the lower section of the inner circumferential surface of the hub portion 314 and the upper section of the outer circumferential surface of the stator fixing portion 211a. The radial width of the first communication gap 73 and the axial width of the second communication gap 72 are preferably smaller than the radial maximum width of the cylinder gap 474. With this configuration, it is possible to further prevent the lubricant 46 from being vaporized from the cylinder gap 474.

Figure 18:
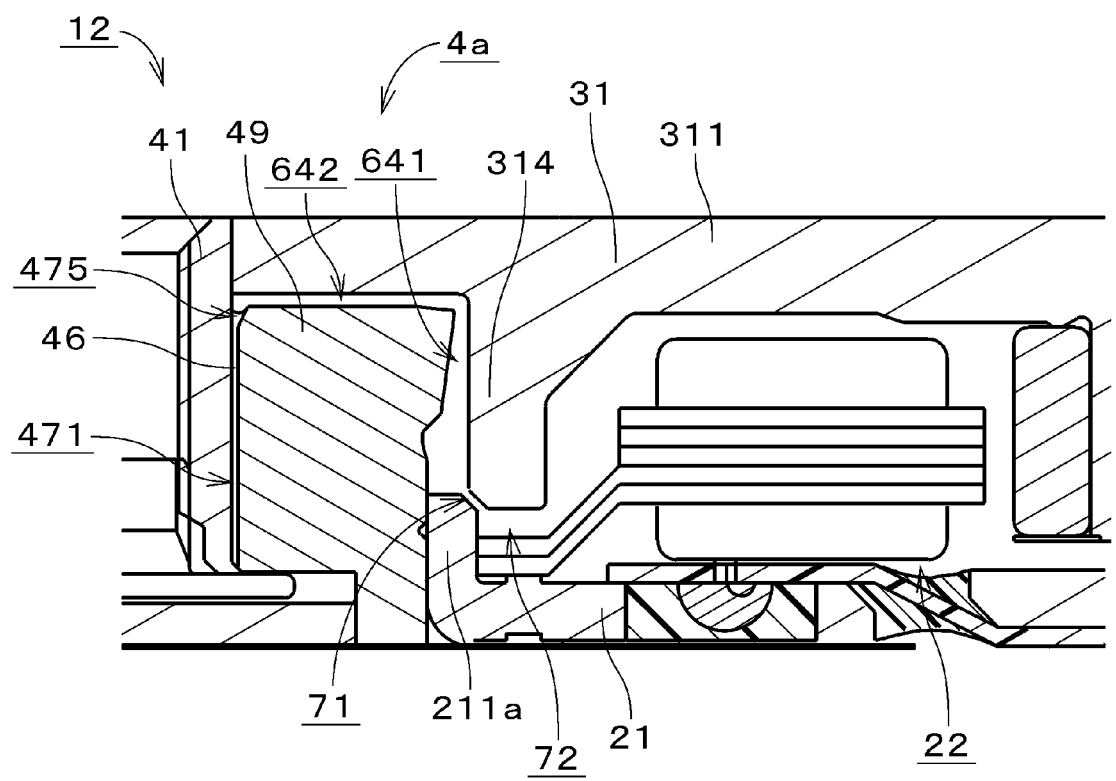
FIG. 18 is a sectional view showing a motor according to a second preferred embodiment.

FIG. 18 is a view showing a motor 12 according to a second preferred embodiment of the present invention. A bearing mechanism 4a of the motor 12 preferably includes a single sleeve bearing portion 49 made of, for example, a metal material. A radial gap 471 is defined between the inner circumferential surface of the bearing portion 49 and the outer circumferential surface of the shaft portion 41. At the upper side of the radial gap 471, a seal region 475 is preferably defined between the upper section of the inner circumferential surface of the bearing portion 49 and the upper section of the outer circumferential surface of the shaft portion 41. The lower section of the outer circumferential surface of the bearing portion 49 is inserted into the stator fixing portion 211a of the base plate 21. A substantially cylindrical cylinder gap 641 is defined between the upper section of the outer circumferential surface of the bearing portion 49 and the hub portion 314 of the rotor hub 31. The cylinder gap 641 is connected to the seal region 475 through a gap 642 radially extending between the upper surface of the bearing portion 49 and the lower surface of the cover portion 311 of the rotor hub 31 positioned radially inward of the hub portion 314. Other structures of the motor 12 preferably remain the same as the structures of the motor 12 shown in FIG. 16.

In the motor 12, the gap 642, the cylinder gap 641, the first communication gap 71, and the second communication gap 72 are defined between the seal region 475 and the space around the stator 22. It is therefore possible to further prevent the lubricant 46 from being vaporized from the seal region 475. In the motor 12, a first communication gap 73 which is a vertical gap may also be provided as is the case in FIG. 17.

While certain preferred embodiments of the present invention have been described above, the present invention is not limited to the foregoing preferred embodiments but may be modified in many different forms. For example, in the foregoing preferred embodiments, it is only necessary that the slanted surface 511a be provided in at least the portion of the upper edge 511 of the substrate insertion hole 51 making contact with the connection portion 231 and further that the slanted surface 512a be provided in at least the portion of the lower edge 512 making contact with the lead portion 232. With this configuration, it is possible to easily insert the lead portion 232 into the substrate insertion hole 51. Instead of the slanted surfaces 511a and 512a, curved bulging surfaces may alternatively be provided in the upper edge 511 and the lower edge 512, respectively.

The substrate insertion hole 51 may be arranged so that the lower opening thereof can be included in the peripheral portion 212 positioned lower than the step portion 213. As long as the lead portion 232 is arranged below the peripheral portion 212 through the substrate insertion hole 51, at least a portion of the lower opening of the substrate insertion hole 51 may be included in the step portion 213 or the peripheral portion 212. In the motor 12, at least some portions of the solder portions 233 are positioned within the solder reception holes 52. This makes it possible reduce the height of the motor 12.

In the motor 12 shown in FIG. 4, the connection portion 231 of the substrate 23 may be adhesively bonded to the lower sections of the coils 222. In this case, prior to attaching the stator 22 and the substrate 23 to the base plate 21, the upper surface of the connection portion 231 is adhesively bonded to the coils 222 and the lead wires 223 are soldered to the lower surface of the connection portion 231. The outlet holes 231b and the solder portions 233 need not necessarily overlap with each other in the axial direction. In that case, the outlet holes 231b may preferably be closed by an adhesive agent or the like, for example. The lower surface of the connection portion 231 may be adhesively bonded to the upper surface 215 of the central portion 211. In that case, it is preferred that the stator 22 be attached to the base plate 21 after the lower surface of the connection portion 231 is adhesively bonded to the upper surface of the central portion 211.

In the preferred embodiments described above, a cutout portion may be provided in the connection portion 231. The lead wires 223 may be led to the lower surface of the connection portion 231 through the cutout portion. In the motor 12, the adhesive agent 24 need not be necessarily filled into the solder reception holes 52. The solder reception holes 52 may be closed by the seal member 45 to prevent leakage of a gas. The seal member 45 may be brought into contact with the solder portions 233 to press the solder portions 233 upward. With this configuration, it is possible to prevent the solder portions 233 from being extruded out of the solder reception holes 52.

The base plate 21 may be formed by, for example, a cutting work rather than a press work. Since the upper section of the step portion 213 exists at least in the section of the lower surface of the base plate 21 where the lead portion 232 exists, the lead portion 232 is prevented from protruding downward from the base plate 21. The stator fixing portion 211a may be provided independently of the base plate 21.

In the motor 12 shown in FIG. 2, the shaft portion 41 may be provided independently of the rotor hub 31. In that case, the shaft portion 41 is preferably fixed to the rotor hub 31 by, for example, press-fitting or other desirable methods. In the motors 12 shown in FIGS. 2 and 16, the thrust dynamic pressure groove array may be provided on the upper surface of the cylinder portion 431 of the sleeve housing 43. In the related preferred embodiments described above, the stator core may be indirectly fixed to the stator fixing portion 211a through an annular member.

The technique of providing the solder reception holes in the base plate may be applied to a motor of a large-size disk drive apparatus holding a plurality of disks.

Figure 19:
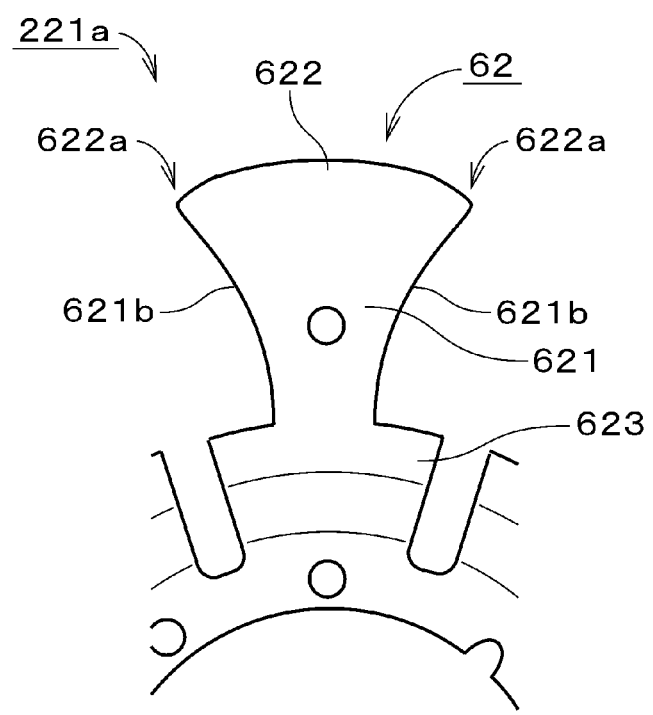
FIG. 19 is a plan view showing another example of the stator core in accordance with a preferred embodiment of the present invention.

In the stator core 221a shown in FIG. 9, as can be noted from a plan view shown in FIG. 19, the circumferential opposite end sections 621b of the coil winding portion 621 of each of the teeth portions 62 may be curved to extend radially outward from the center of the coil winding portion 621 toward the circumferential opposite sides. The circumferential opposite end sections 621b of the coil winding portion 621 are connected to the circumferentially opposite ends 622a of the tip end portion 622. The circumferential width of the increased width portion 623 and the tip end portion 622 is larger than the width of the narrowest section, i.e., the radial inner section, of the coil winding portion 621. In the stator core 221a including the teeth portions 62 shown in FIG. 19, the provision of the increased width portion 623 makes it possible to secure a magnetic path within the stator core 221a. Since the circumferential width of the tip end portion 622 and the circumferential minimum width of the increased width portion 623 are larger than the minimum width of the coil winding portion 621, it is possible to efficiently prevent the magnetic flux from getting saturated. It is however more desirable that the circumferential width of the tip end portion 622 and the circumferential minimum width of the increased width portion 623 be larger than the maximum width of the coil winding portion 621. This holds true in other preferred embodiments described above.

In the stator core 221a, when seen in a plan view, the circumferentially opposite end sections 623a of the increased width portion 623 are positioned on the straight lines L1 interconnecting the center axis J1 and the circumferentially opposite ends 622a of the tip end portion 622. Alternatively, the circumferentially opposite end sections 623a of the increased width portion 623 may be positioned circumferentially outward of the straight lines L1, namely at the opposite sides of the straight lines L1 from the center of the tip end portion 622. The radial inner end of the slit 625 may be positioned a little radially outward of the inner edge section 424b of the slanted portion 424. In the stator core 221a, the increased width portion 623 as a whole may be a slanted portion. As shown in FIG. 14, the protrusions 217 provided on the base plate 21 may be inserted into the slits 625 to fix the position of the stator core 221a relative to the base plate 21 in the plane substantially perpendicular to the center axis J1.

The number of the projections 217 of the base plate 21 is not limited to three but may alternatively be two or other numbers greater than three. The angle between at least one set of adjoining projections 217 among the plurality of projections 217 is preferably equal to or larger than about 90 degrees and smaller than about 180 degrees. If the number of the protrusions 217 is two, it is preferred that the angle between the two projections 217 about the center axis J1 be equal to about 180 degrees. Pins inserted into through-holes defined in the base plate 21 may be used as the protrusions. Two or more cutout portions 612 may be provided in the core-back 61. In that case, the protrusions of the base plate 21 may be inserted into the cutout portions 612, thereby fixing the position of the stator core 221a relative to the base plate 21 in the plane perpendicular to the center axis J1.

In the stator core 221c shown in FIG. 15, only a portion of the core-back 61 may be an annular slanted portion. In the first and second preferred embodiments, the number of the core members 220 defining the core-back 61 of the stator core 221d and the section of the increased width portion 623 existing radially inward of the upper end of the slanted portion 624 may be three or four rather than two. The axial thickness of the teeth portions 62 and the axial thickness of the core-back 61 may be equal to each other, as long as the first communication gaps 71 and 73 and the second communication gap 72 can be provided.

The configurations of the above-described preferred embodiments and modifications thereof may be appropriately combined unless contradictory to one another.

The preferred embodiments of the present invention can be used as a motor for a disk drive apparatus and as a motor for an apparatus other than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
a stationary unit;
a rotary unit; and
a bearing mechanism arranged to support the rotary unit so as to rotate with respect to the stationary unit about a center axis extending in an up-down direction; wherein
the rotary unit includes a cover portion extending around the center axis, a cylindrical sidewall portion extending downward from an outer edge of the cover portion, a tubular hub portion protruding downward from the cover portion at a radial inner side of the sidewall portion and a rotor magnet fixed to an inner circumferential surface of the sidewall portion;
the bearing mechanism includes a shaft portion extending downward from the cover portion along the center axis and a bearing portion to which the shaft portion is inserted, the bearing portion being arranged to support the shaft portion through a lubricant, the bearing portion including an upper section positioned radially inward of the hub portion;
the stationary unit includes a stator positioned radially inward of the rotor magnet, a base portion positioned below the stator and a stator fixing portion having a substantially cylindrical shape to extend upward from a central portion of the base portion, the stator fixing portion including an upper end positioned inward of the hub portion and higher than a lower end of the hub portion;
the stator includes a stator core and a plurality of coils;
the stator core includes an annular core-back arranged below the hub portion and a plurality of teeth portions extending radially outward from the core-back;
each of the teeth portions includes a coil winding portion wound with each of the coils and a slanted portion positioned between the core-back and the coil winding portion to extend radially outward and upward;
a seal region in which a boundary surface of the lubricant is provided is defined between the upper section of the bearing portion and the rotary unit;
a substantially cylindrical cylinder gap is defined between an inner circumferential surface of the hub portion and an outer circumferential surface of the upper section of the bearing portion;
a first communication gap is defined between a lower section of the hub portion and an upper section of the stator fixing portion, the first communication gap including a section extending in an axial direction or inclined radially outward and downward; and
a second communication gap is defined between the lower end of the hub portion and a radial inner section of the stator core, the second communication gap extending radially outward from the first communication gap.

2. The motor of claim 1, wherein the seal region is defined in the cylinder gap.

3. The motor of claim 2, wherein the seal region is defined between an inner circumferential surface of the upper section of the bearing portion and an outer circumferential surface of the upper section of the shaft portion, the seal region being radially connected to the cylinder gap at an upper side of the bearing portion.

4. The motor of claim 3, wherein the core-back has an axial thickness smaller than an axial thickness of the coil winding portion of each of the teeth portions.

5. The motor of claim 1, wherein the seal region is defined between an inner circumferential surface of the upper section of the bearing portion and an outer circumferential surface of the upper section of the shaft portion, the seal region being radially connected to the cylinder gap at an upper side of the bearing portion.

6. The motor of claim 5, wherein the core-back has an axial thickness smaller than an axial thickness of the coil winding portion of each of the teeth portions.

7. The motor of claim 1, wherein the core-back has an axial thickness smaller than an axial thickness of the coil winding portion of each of the teeth portions.

8. The motor of claim 7, wherein the coil winding portion includes five steel plates stacked one above another, and the core-back includes two, three or four steel plates stacked one above another.

9. The motor of claim 1, wherein the first communication gap has a width smaller than a radial maximum width of the cylinder gap.

10. The motor of claim 1, wherein the second communication gap has a radial width larger than a radial width of the core-back.

11. The motor of claim 1, wherein the base portion and the stator fixing portion are defined a single monolithic member.

12. A disk drive apparatus, comprising:
- the motor of claim 1 arranged to rotate a disk;
- an access unit arranged to perform at least one of an information reading task and an information recording task with respect to the disk; and
- a housing arranged to accommodate the disk, the motor and the access unit.

* * * * *